United States Patent
Tweedie et al.

[19]

[11] Patent Number: 6,044,867
[45] Date of Patent: Apr. 4, 2000

[54] METHOD AND APPARATUS FOR FABRICATING A FLEXIBLE LINING WITH FLEXIBLE COLLAR FOR LINING LATERAL PIPELINES

[75] Inventors: John Tweedie, St. Peters, Mo.; Philip M. Smith, Fort Worth, Tex.; Jeff Wells, Chesterfield, Mo.; Kevin P. Murray, Schaumburg, Ill.

[73] Assignee: Insituform (Netherlands) N.V., Netherlands

[21] Appl. No.: 09/342,705

[22] Filed: Jun. 29, 1999

Related U.S. Application Data

[62] Division of application No. 08/979,272, Nov. 26, 1997, Pat. No. 5,915,419.

[51] Int. Cl.$^7$ ............................................. F16L 55/16
[52] U.S. Cl. ............................. 138/98; 138/97; 156/287; 264/269
[58] Field of Search ................... 138/98, 97; 156/287, 156/94; 264/269, 36; 405/50.1

[56] References Cited

U.S. PATENT DOCUMENTS

| | | | |
|---|---|---|---|
| 2,944,994 | 7/1960 | Singleton et al. | 523/513 |
| 3,804,663 | 4/1974 | Clark | 427/542 |
| 3,946,761 | 3/1976 | Thompson et al. | 138/98 |
| 4,009,063 | 2/1977 | Wood | 156/71 |
| 4,064,211 | 12/1977 | Wood | 264/95 |
| 4,135,958 | 1/1979 | Wood | 156/199 |
| 4,425,287 | 1/1984 | Hesse et al. | 264/447 |
| 4,434,115 | 2/1984 | Chick | 264/36.17 |
| 4,439,469 | 3/1984 | Wood | 427/508 |
| 4,518,247 | 5/1985 | Nishikawa | 355/15 |
| 4,581,247 | 4/1986 | Wood | 427/508 |
| 4,680,066 | 7/1987 | Wood | 156/156 |
| 4,687,677 | 8/1987 | Jonasson | 427/8 |
| 4,991,006 | 2/1991 | Wood | 348/84 |
| 5,018,545 | 5/1991 | Wells | 134/113 |
| 5,108,533 | 4/1992 | Long, Jr. et al. | 156/294 |
| 5,199,463 | 4/1993 | Lippiatt | 138/98 |
| 5,329,063 | 7/1994 | Endoh | 138/98 |
| 5,340,160 | 8/1994 | Meijers et al. | 285/15 |
| 5,393,481 | 2/1995 | Wood | 264/516 |
| 5,395,862 | 3/1995 | Neckers et al. | 522/25 |
| 5,423,630 | 6/1995 | Imoto et al. | 138/97 X |
| 5,439,033 | 8/1995 | Kamiyama et al. | 138/98 |
| 5,451,284 | 9/1995 | Ikeda et al. | 156/247 |
| 5,451,343 | 9/1995 | Neckers et al. | 252/582 |
| 5,514,519 | 5/1996 | Neckers et al. | 430/269 |
| 5,606,171 | 2/1997 | Neckers et al. | 250/459.1 |
| 5,609,439 | 3/1997 | Schreiner et al. | 405/154 |
| 5,623,080 | 4/1997 | Neckers et al. | 549/393 |
| 5,624,629 | 4/1997 | Wood | 264/516 |
| 5,639,802 | 6/1997 | Neckers et al. | 522/25 |
| 5,692,543 | 12/1997 | Wood | 138/98 |
| 5,807,025 | 9/1998 | Sundermann | 138/98 X |

FOREIGN PATENT DOCUMENTS

| | | |
|---|---|---|
| 0 025 359 | 9/1979 | European Pat. Off. . |
| 0 039 838 | 11/1981 | European Pat. Off. . |
| 406 876 | 1/1991 | European Pat. Off. . |
| 0 518 521 A2 | 12/1992 | European Pat. Off. . |
| 39 29 558 A1 | 3/1991 | Germany . |
| 40 31 949 A1 | 4/1992 | Germany . |
| 42 07 038 | 9/1993 | Germany . |
| 2 041 147 | 9/1980 | United Kingdom . |
| WO 91/07619 | 5/1991 | WIPO . |
| WO 91/16568 | 10/1991 | WIPO . |
| WO 95/08737 | 3/1995 | WIPO . |

*Primary Examiner*—Patrick Brinson
*Attorney, Agent, or Firm*—Cowan, Liebowitz & Latman, P.C.; Michael I. Wolfson; Lloyd G. Buchanan

[57] ABSTRACT

A method and apparatus for fabricating a resin impregnable flexible liner for lining a lateral pipe which leads into a main pipe having at one end a flexible collar for installation at the location where the lateral liner meets the main is provided. The seal is formed using a pipe template with an opening conforming to the lateral to be sealed. A tubular portion of liner is inserted into the opening and a ring of flexible impregnable material is bonded to the tubular portion about the opening. An expandable plug holds the elements in position during bonding.

2 Claims, 6 Drawing Sheets

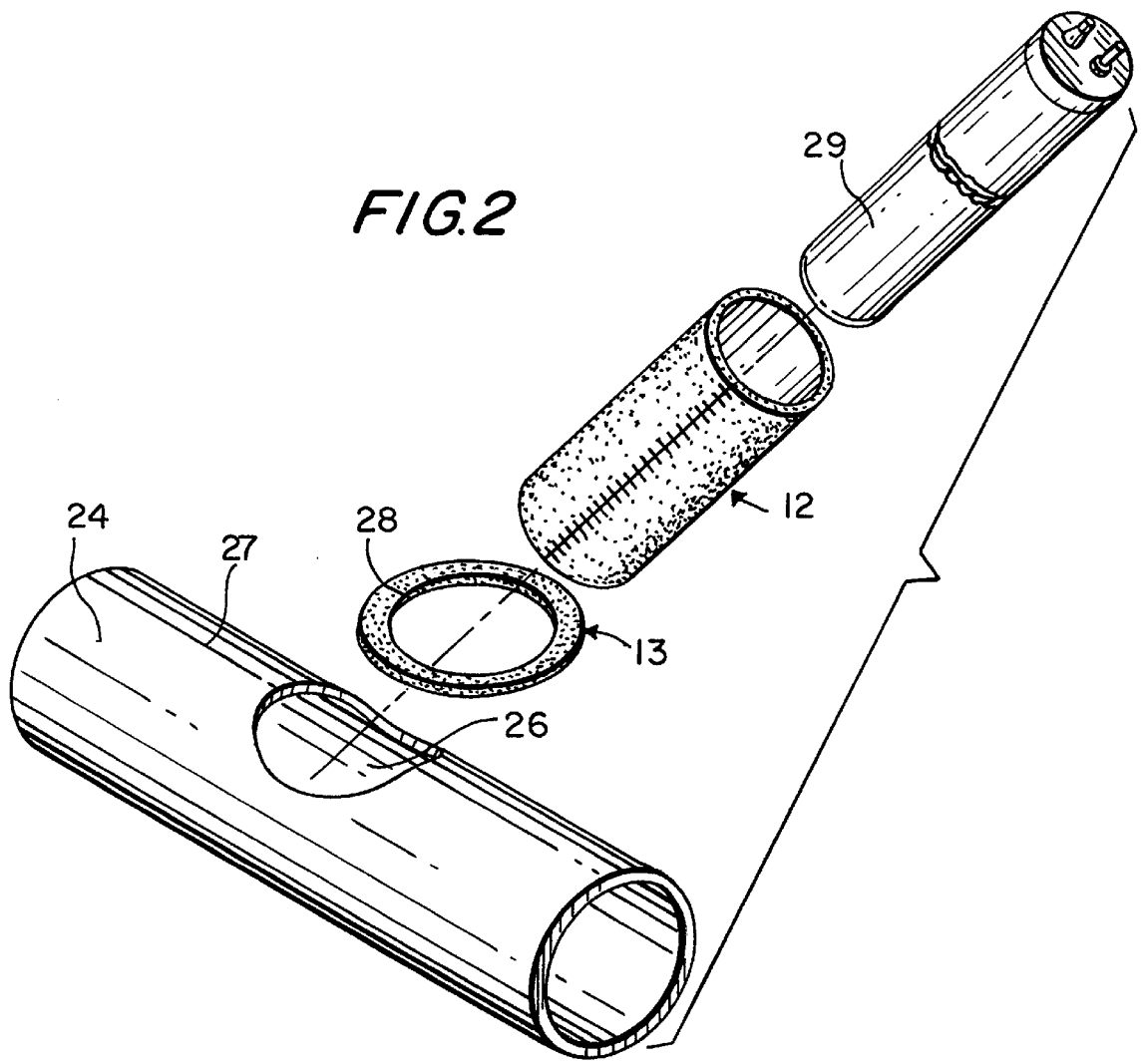
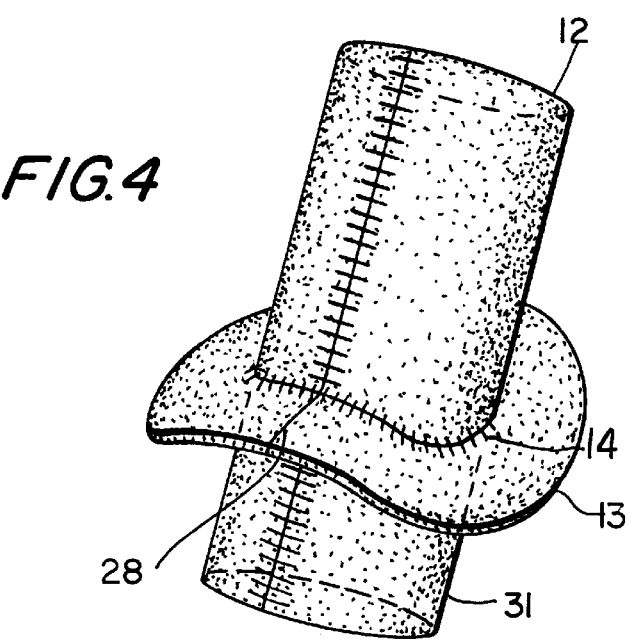

METHOD AND APPARATUS FOR FABRICATING A FLEXIBLE LINING WITH FLEXIBLE COLLAR FOR LINING LATERAL PIPELINES

CROSS-REFERENCE TO RELATED APPLICATIONS

This application is a divisional of application Ser. No. 08/979,272, filed on Nov. 26, 1997, now U.S. Pat. No. 5,915,419.

BACKGROUND OF THE INVENTION

This invention relates to the lining of pipelines or existing conduits using flexible tubular materials which are impregnated with curable synthetic resins, and more particularly to a lateral seal for sealing the junction between the conduit being relined and a lateral connection.

The most widely practiced method of lining existing pipelines and conduits using a flexible resin impregnated lining or "cured in place pipe" is the Insituform® Process and is described in U.S. Pat. No. 4,009,063 and U.S. Pat. No. 4,064,211, the contents of which are incorporated herein by reference. Briefly, in the Insituform® Process, an elongated flexible tubular lining of a resin impregnable material, such as a needled felt, which has been impregnated with a thermosetting synthetic resin, is installed within an existing pipeline that is in need of repair. The impregnated liner may be pulled into the conduit by a rope or cable, and a fluid-impermeable inflation bladder or tube is then everted within the liner as described in detail in U.S. Pat. No. 4,009,063. Alternately, the liner is installed utilizing an eversion process as described in U.S. Pat. No. 4,064,211. The liners utilized in the Insituform® Process are flexible and generally have a smooth impermeable coating on one side. After inversion, this smooth layer becomes the inside of the liner.

After the flexible liner is positioned within the conduit, the liner is pressurized from within, preferably using a fluid such as water. The fluid pressure forces the liner radially outwardly to engage and conform to the interior surface of the existing pipeline. The resin is then cured by recirculating heated water to form a relatively hard, tight-fitting rigid pipe lining that effectively relines the existing pipeline. In addition to curing by heat, the resin can be cured using other forms of radiant energy, such as ultra violet light as described in U.S. Pat. No. 4,135,958 or visible light in U.S. Pat. No. 4,518,247 and U.S. Pat. No. 4,680,066, the contents of which are incorporated herein by reference. Alternatively, radiant energy in the form of electrical energy or sound waves can be used to initiate the cure. Once the liner is completely cured, lateral connections are cut to existing services to the liner by remote cutters, which are common expedients in the art.

There is a strong demand and a need to seal the connections between the main conduit and any lateral pipes, in addition to the repair of the main pipeline. This is an important consideration in the process of relining an entire existing sewer system in order to effectively prevent the ingress of ground water into the system and outflow of effluent from the system.

In a typical municipal sewer system, there are a plurality of lateral pipeline entering a main conduit between adjacent manhole access points. The time needed to cure a cured in place liner that has been installed in a main pipeline is typically between four and six hours. Using existing methods of lining or lateral pipelines or is not possible to perform any significant repair or lining operations of the plurality of lateral connections at the same time that a main conduit is being lined. Repair or sealing of each lateral connection using conventional lining methods is difficult. Such long cure times would generally increase the amount of time required to complete the repair of a particular line by almost a full day of work for each lateral connection. Since a typical residential street may have about ten or more homes between manholes, this would increase the operating time needed to complete the lining operation for repair of the main pipeline between adjacent manholes from one day to ten days or more.

There are presently several proposals available for lining lateral pipelines and forming a seal at the lateral connection. Some of these call for lining the lateral from the outlet of the service lateral inward to the mainline conduit. One such method is described in U.S. Pat. No. 5,108,533. Others utilize a launcher-type apparatus that inserts a lining from the main pipeline into the lateral connection at a location remote from the access to the main pipeline. This process is described in U.S. Pat. No. 5,624,629, the contents of which are incorporated herein by reference. Here, a second or subsequent lateral is lined and cured, at the same time as an initial lateral is being lined in an effort to reduce the overall time of repair of the system. However, because several laterals are typically connected to a particular mainline conduit, it is difficult and almost physically impossible to install lateral seals at more than one location within a mainline conduit at the same time.

Accordingly, it is desirable to provide an improved cured in place lateral seal for lining the connection of a lateral to a main pipeline which overcomes the serious time deficiencies of the prior art and provides an efficient seal. It is desirable to improve the speed and cycle time required to install a lateral seal in order to provide a truly cost effective service of installation of lateral seals.

SUMMARY OF THE INVENTION

Generally speaking, in accordance with the invention, an improved cured in place lateral seal impregnated with a curable resin for sealing the connection between an existing main conduit and an intersecting lateral pipeline is provided. The lateral seal is in the form of a "floppy top hat," which includes a brim portion of the top hat and a relatively short tubular section bonded to the inner opening in the brim as the crown of the "top hat." The tubular portion is bonded to the brim at an angle corresponding to the angle of the intersection of the lateral pipeline and main pipeline to be sealed.

The lateral seal is formed using a template in the form of a pipe having a dimension and opening corresponding to those of the existing conduit and lateral pipeline which is to be sealed. This provides a seal of the proper size and shape. An annular or ring section of liner material is placed about the template opening, and a section of tubular material is inserted through the ring and the opening. Next, an inflatable plug is placed inside the tubular section into the pipe template, and the plug is expanded. The ring section is then bonded to the tubular section by glue, heat or any other suitable manner to form a "brim" about the tubular section. The plug is then removed, and the section of tubular material that was inside the pipe template is removed, leaving a flexible lining seal in the form of a top hat.

The resin impregnable layer of the top hat is impregnated with a resin. This is done by sealing the end of the tubular portion of the seal and placing the seal into a transparent and flexible container including a predetermined quantity of a selected resin with the sealed end facing the resin. The container is sealed and a vacuum is drawn. The resin is then massaged and forced upwardly through the resin absorbent material to completely impregnate the tubular portion and brim portion. The vacuum is removed and the container is sealed. The lateral seal is ready for installation using a remote launching device.

Accordingly, it is an object of the invention to provide an improved cured in place lateral seal for sealing the connection between a lateral and main pipeline.

Another object of the invention is to provide an improved method for preparing a cured in place lateral seal in the form of a top hat.

A further object of the invention is to provide an apparatus for fabricating a cured in place lateral seal in the form of a top hat.

Yet a further object of the invention is to provide an improved method of impregnating the lateral seal prior to installation.

Still other objects and advantages of the invention will in part be obvious and will in part be apparent from the specification.

The invention accordingly comprises the several steps and the relation of one or more of such steps with respect to each of the others, the apparatus embodying features of construction, combinations and arrangement of parts which are adapted to effect such steps, and the article which possesses the characteristics, properties and relation of elements, all as exemplified in the detailed disclosure hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which:

FIG. 2 is an exploded perspective view of an apparatus for fabricating the lateral seal of FIG. 1 in accordance with the invention;

FIG. 4 is a perspective view of the lateral seal fabricated with the apparatus of FIG. 2 prior to removal of excess tubular material;

DESCRIPTION OF THE PREFERRED EMBODIMENTS

Figure 1:
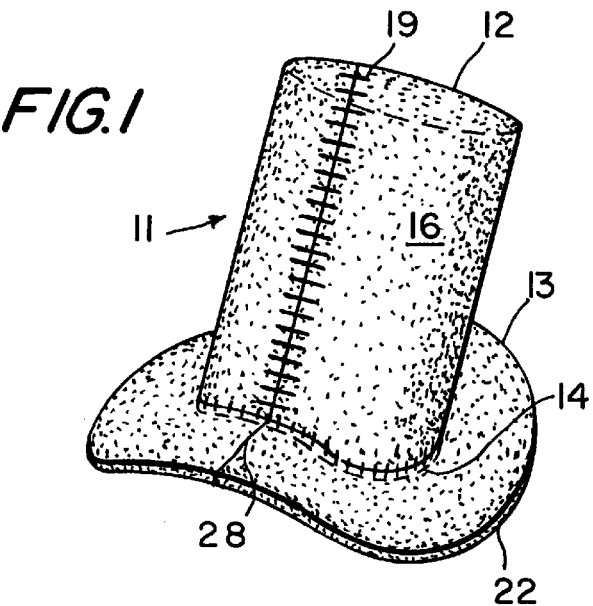
FIG. 1 is a perspective view of the completed flexible lateral seal in the form of a top hat constructed and arranged in accordance with the invention.
Figure 10:
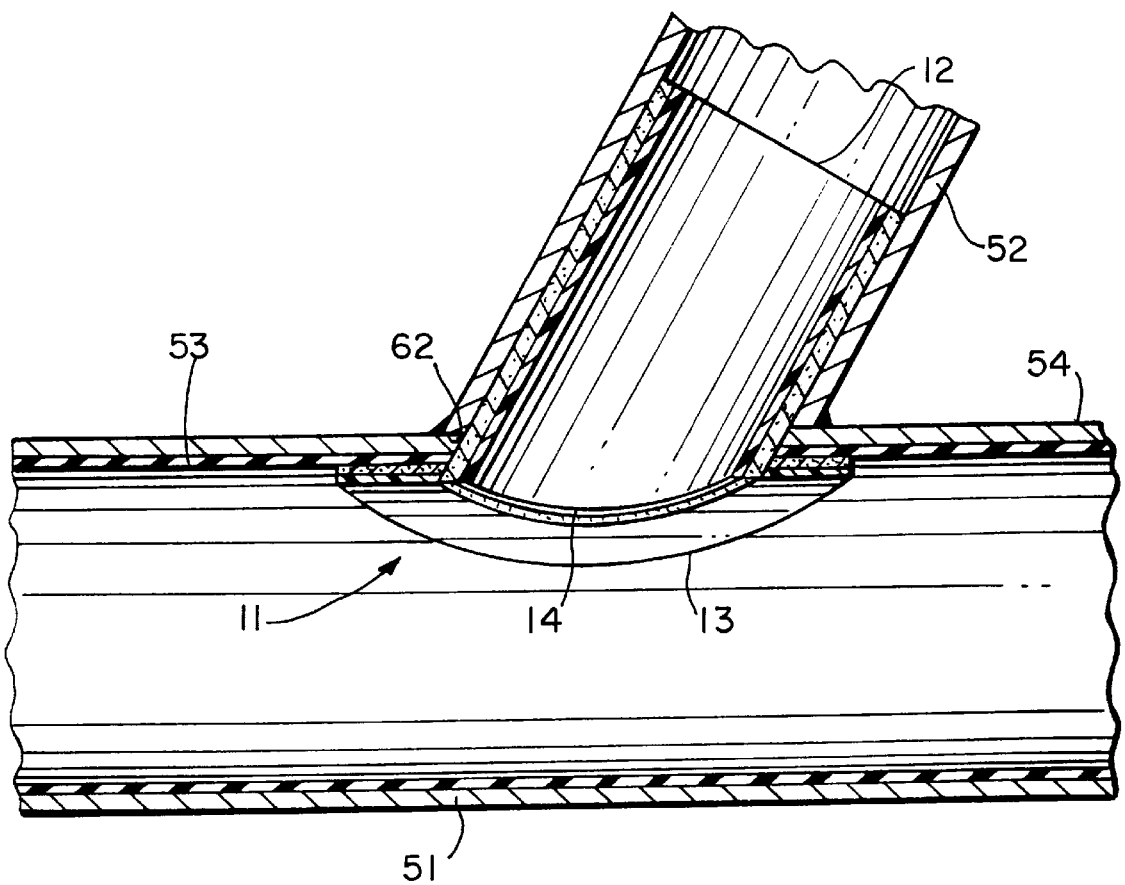
FIG. 10 is a schematic illustration of the lateral seal of FIG. 1 being installed at the lateral connection.

Referring to FIG. 1, a lateral seal 11 constructed and arranged in accordance with the invention as shown. Seal 11 will be used for lining the intersection of a main pipeline 51 and a connecting lateral pipeline 52 as shown in FIG. 10. Seal 11 includes a relatively short tubular section 12 and a flat brim section 13, which are bonded together by an adhesive bond 14. Tubular section 12 is formed of a substantially planar piece of flexible resin impregnable material 16, such as a needled felt. Resin-impregnable material 16 is coated with a smooth impermeable layer 17 on one surface. Tubular section 13 is joined together by a plurality of stitches 19 such that when the tubular section 12 is inflated to its circular form the edges are in butting contact. An impregnable tape or seal is disposed over stitches 19 to maintain the impermeable characteristic of impermeable layer 17.

Brim section 13 is formed of a layer of resin impregnable material 21, such as a needled felt. Resin impregnable material layer 21 is coated with a smooth impermeable layer 22 on one side. Smooth coating 17 and 22 will become the inside of lateral seal 11 facing the interior of pipelines 51 and 52 after installation. When preparing lateral seal 11, tubular section 12 is bonded to ring section 13 by a bond 14 at an angle corresponding to the angle of the intersection of lateral 52 and main pipeline 51 desired to be sealed.

Selection of materials for resin impregnable materials 16 and 21 and smooth impermeable layers 17 and 22 is dependent on the end use of the pipelines and ability of the particular resin impregnable material to transmit the radiant energy used to cure resin in seal 11. In one preferred embodiment of the invention the radiant energy used for curing is visible light. In this case, acrylic or polypropylene fibers are chosen as the resin impregnable materials 16 and 21 because when these fibers are wetted with a light curable resin, it has the ability to transmit sufficient visible light to cure the resin.

Figure 3:
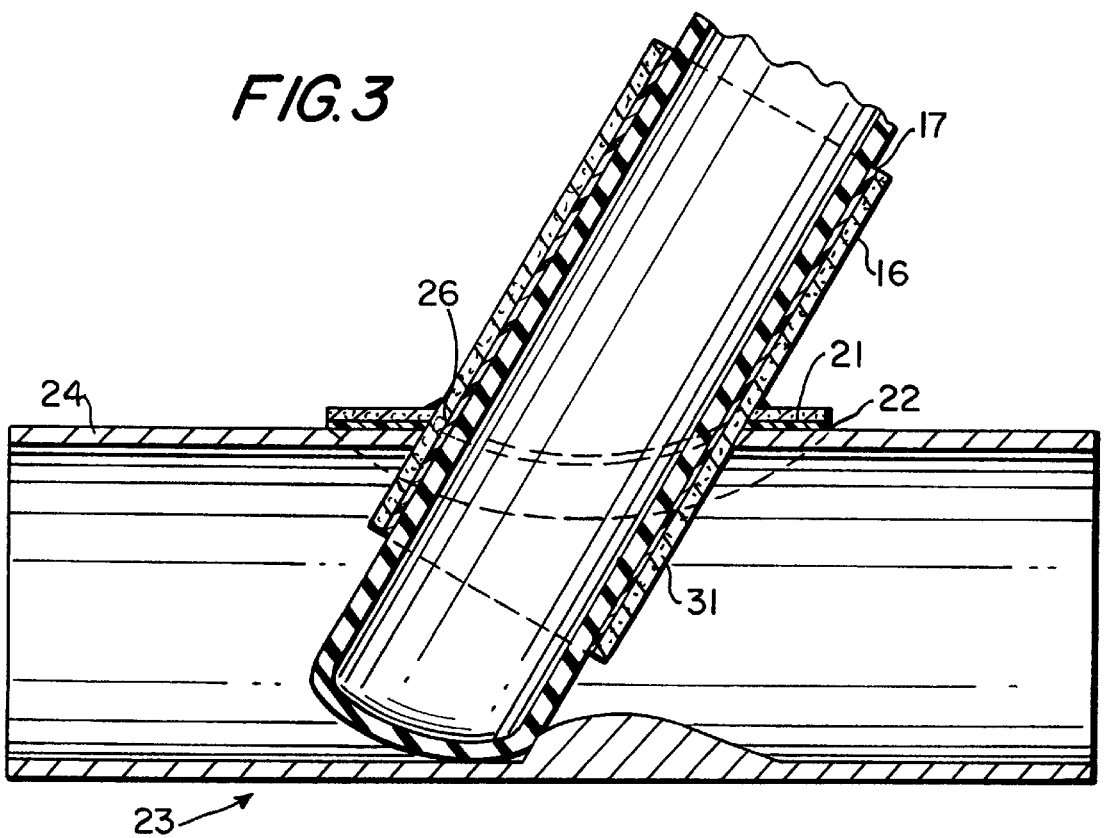
FIG. 3 is a cross-sectional view of the apparatus of FIG. 2 showing the position of elements during fabrication of a lateral seal for a 60° wye lateral connection.

FIG. 2 is an exploded perspective view of the components forming lateral seal 11 and an apparatus 23 for use in fabricating lateral seal 11 in accordance with the invention is shown in FIG. 3. In order to form lateral seal 11 having the correct angle, a pipe template 24 is used to provide a model for the actual intersection of mainline conduit and lateral pipeline to be sealed. Pipe template 24 is in the form of a pipe having an outside diameter dimension corresponding to the inside diameter of the main pipeline to be sealed and an opening 26 corresponding to the size, shape and angle of the opening of the lateral pipeline to be sealed. Preferably, pipe template 24 will have at least one opening 26 corresponding to each of the different lateral intersection angles that are used, which are typically 45°, 60° and 90°. An index line 27 is marked onto the surface of pipe template 24 extending along the longitudinal axis of pipe template 24 from the front and back ends of each opening 26, along the center line of each opening 26. Index line 27 will be used to align shaped ring section 13 properly prior to formation of lateral seal 11.

Ring section 13 is formed by placing a swatch of liner material having resin impregnable layer 21 with impermeable coating 22 over opening 26 in pipe template 24 whose size and angle matches that of the lateral intersection to be sealed. A hole is cut through the swatch conforming to the shape of opening 26 in pipe template 24. The swatch is then cut around the opening such that ring section 13 is formed, with an inner dimension and shape similar to opening 26 in template 24. The width of ring section 13, i.e., the distance between the inner diameter and the outer diameter, should be set to give sufficient coverage of the area within the main pipeline between a previously installed lining in a main pipeline and the lateral pipeline where the seal is to be applied. This width is usually between about 1 to 4 inches, and preferably 2 to 3 inches, but may be larger or smaller as desired such that leakage at the intersection of lateral and main pipeline liner is prevented.

Ring section 13 cut from the swatch of liner material is generally not circular. This is due to the cylindrical surface shape of pipe template 24 and the intersection of the two cylindrical pipes. Thus, in order to enable proper alignment of ring section 13 at the time of formation of lateral seal 11, an index line 28 is inscribed onto resin impregnable layer 21 of ring section 13 in alignment with pipe template index line 27. Index lines 27 and 28 are used to align the components during formation of seal 11, as described in more detail below.

A properly sized ring section 13 is placed about the particular opening 26 in pipe template 24 that most closely approximates the size, shape and angle of the lateral connection desired to be sealed. Ring section 13 is placed such that index line 28 is in alignment and matches up with template index lines 27. This enables ring section 13 to fit properly and closely about opening 26. Impermeable layer 22 of ring section 13 should be placed facing towards template 24.

Tubular section 12 which is longer than needed for the final dimension of seal 11 is then inserted through ring 13 and opening 26 at an angle corresponding to that of the lateral connection to be sealed, as shown in FIG. 3. A bottom section 31 of tubular section 12 is within pipe template 24. Tubular section 12 is oriented such that impermeable layer 17 is on the inside and resin impregnable layer 16 is on the outside. An elongated inflatable plug 29 is placed inside tubular section 12 and through opening 26, and expanded. When inflatable plug 29 is inflated, tubular section 13 is expanded to its full diameter such that resin impregnable layer 16 contacts the inner edge of ring section 13, which is seated on the surface of template 24 about opening 26. When in this position, ring section 13 is bonded to tubular section 12 by glue, heat or any other suitable manner at bond line 14, as shown in FIG. 3.

Plug 29 is then deflated and removed. The combined tubular section 12 and ring section 13, shown in FIG. 4, remain bonded to each other at bond line 14. Bottom section 31 of tubular section 12, which had previously been inside pipe template 24,is removed. What remains, as shown in FIG. 1, is flexible lateral seal 11 in the form of a top hat, in which the remaining, upper portion of tubular section 12 forms the cylindrical crown and ring section 13 forms the flange-like brim.

Figure 5:
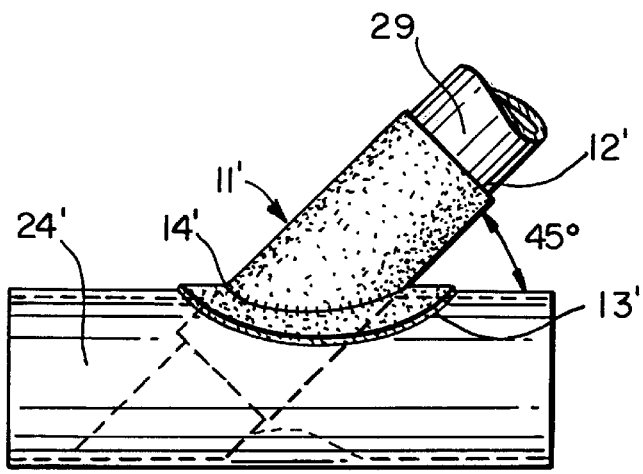
FIG. 5 is a cross-sectional view showing the orientation of element of the apparatus of FIG. 2 when forming a lateral seal for a 45° wye lateral connection.
Figure 6:
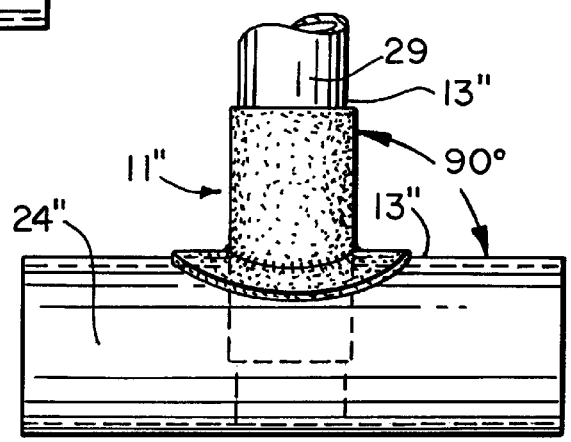
FIG. 6 is a cross-sectional view showing the orientation of element of the apparatus of FIG. 2 when forming a lateral seal for a 90° lateral connection.

Additional templates 24' and 24' are shown in FIGS. 5 and 6, respectively. FIG. 5 shows an external view of tubular section 12' inserted at a 45° angle through ring section 13' in a pipe template 24' having an opening shaped for a 45° intersection. FIG. 5 also shows elongated inflatable plug 29 inflated within tubular section 12' and having expanded tubular section 12' which is bonded at a bond line 14' to inside edge 35 of ring section 13'. FIG. 6 shows a similar external view, but wherein a tubular section 12" has been inserted through an annular ring section 13" in a pipe template 24" having an opening dimensional for an intersection at an angle of 90°.

Figure 7:
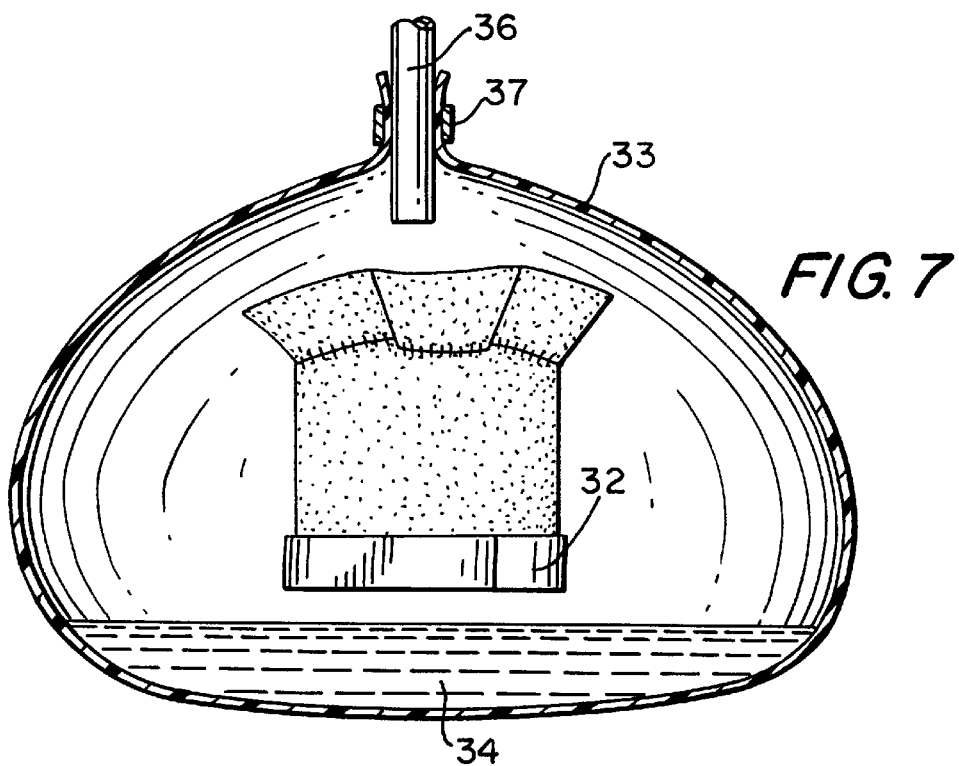
FIG. 7 is a plan view illustrating the first step in the process of impregnating the lateral seal of FIG. 1 with a curable resin in a container.

Prior to installation, lateral seal 11 must be fully impregnated with a thermosetting resin. As illustrated in FIG. 7, this is accomplished first by sealing the cylindrical end of tubular portion 13 of lateral seal 11 using a sealing tape 32, such as duct tape or the like. Lateral seal 11 is then placed within a container 33 having a predetermined quantity of a selected resin 34. This permits resin impregnable material of lateral seal 11 to be completely wetted with resin 34. It is preferable that container 33 be transparent so that confirmation of wet out can be accomplished visually, and resin can be massaged fully into the material.

Figure 8:
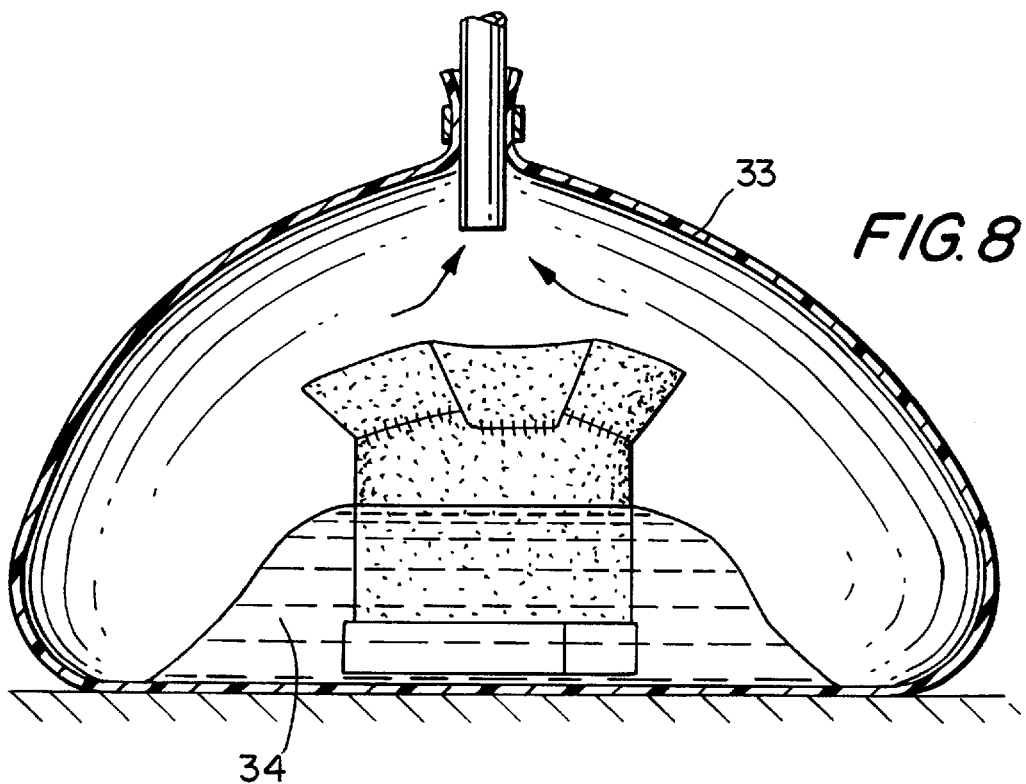
FIG. 8 shows the lateral seal being wet out with resin as the vacuum is drawn on the sealed container.
Figure 9:
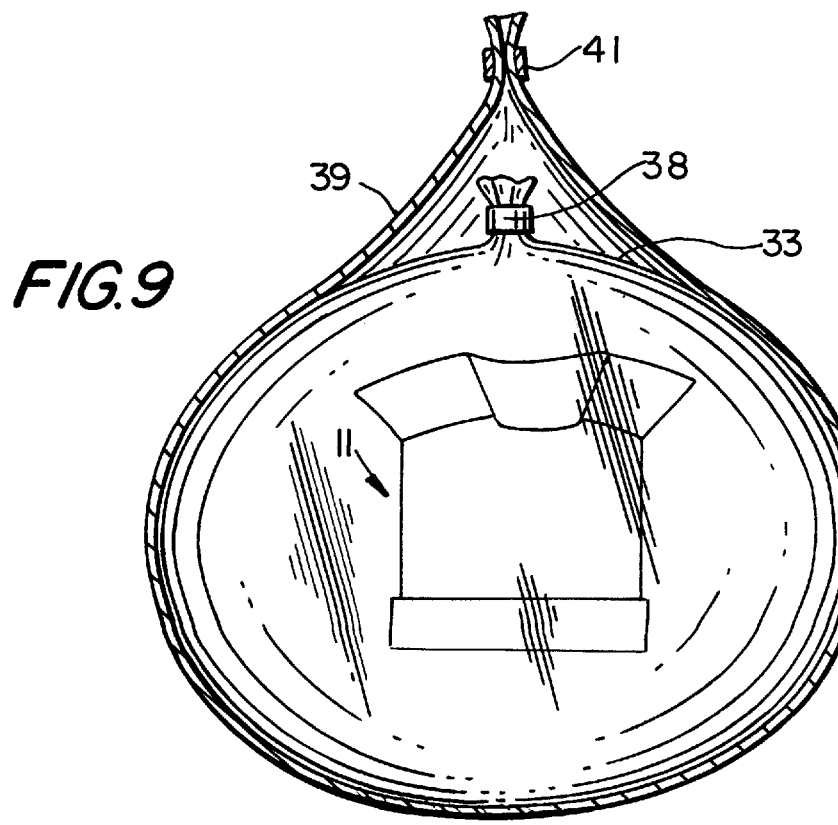
FIG. 9 is a plan view showing the flexible lateral seal of FIG. 1 fully impregnated and encased within the container.

In order to complete the impregnation, a vacuum hose 36 is placed into the opening of container 33, and a seal 37 is secured thereabout. Hose 36 is connected to a vacuum pump (not shown) to create a vacuum within container 33. As can be seen in FIG. 8, resin 34 is then massaged upwardly through resin absorbent layers 16 and 21 of lateral seal 11 to light in order to completely wet out tubular portion 12 and brim portion 13. Once lateral seal 11 is completely impregnated with resin 34, vacuum hose 36 is removed from container 33, a seal 38 is used to seal container 33 as shown in FIG. 9.

At this point, lateral seal 11 is ready for installation. In an embodiment illustrated in FIG. 9 resin 34 is a light curable resin and exposure of the resin-impregnated lateral seal 11 to light will likely cause curing. Thus, seal 11 contained within transparent container 33 must be further secured within an opaque blanket, foil or secondary container 39 which is shown sealed by a seal 41. Seal 11 will thus be protected against premature curing by inadvertent exposure to light prior to installation at the conduit/lateral junction to be sealed.

After lateral seal 11 is installed as shown in FIG. 10, brim 13 sits along the interior surface of main pipeline 51 and will bond to previously installed lining 53. Tubular portion 12 extends a desired distance into lateral pipeline 52. This effectively seals what is generally considered to be a principal shortcoming in the lining of existing pipelines. Lateral seal 11 is installed after an opening 62 is cut in lining 53. Once seal 11 is installed, it will be more difficult for ground water at remote fracture 54 in FIG. 10 from entering relined main pipeline 51 at opening 62. This has been a shortcoming because opening 62 was generally formed using a remote cutting tool with a router bit or the like leaving a rough opening. This has created a long felt need for providing an effective lateral seal to seal the connection between a lateral pipe 52 and main pipeline 51.

Figure 11:
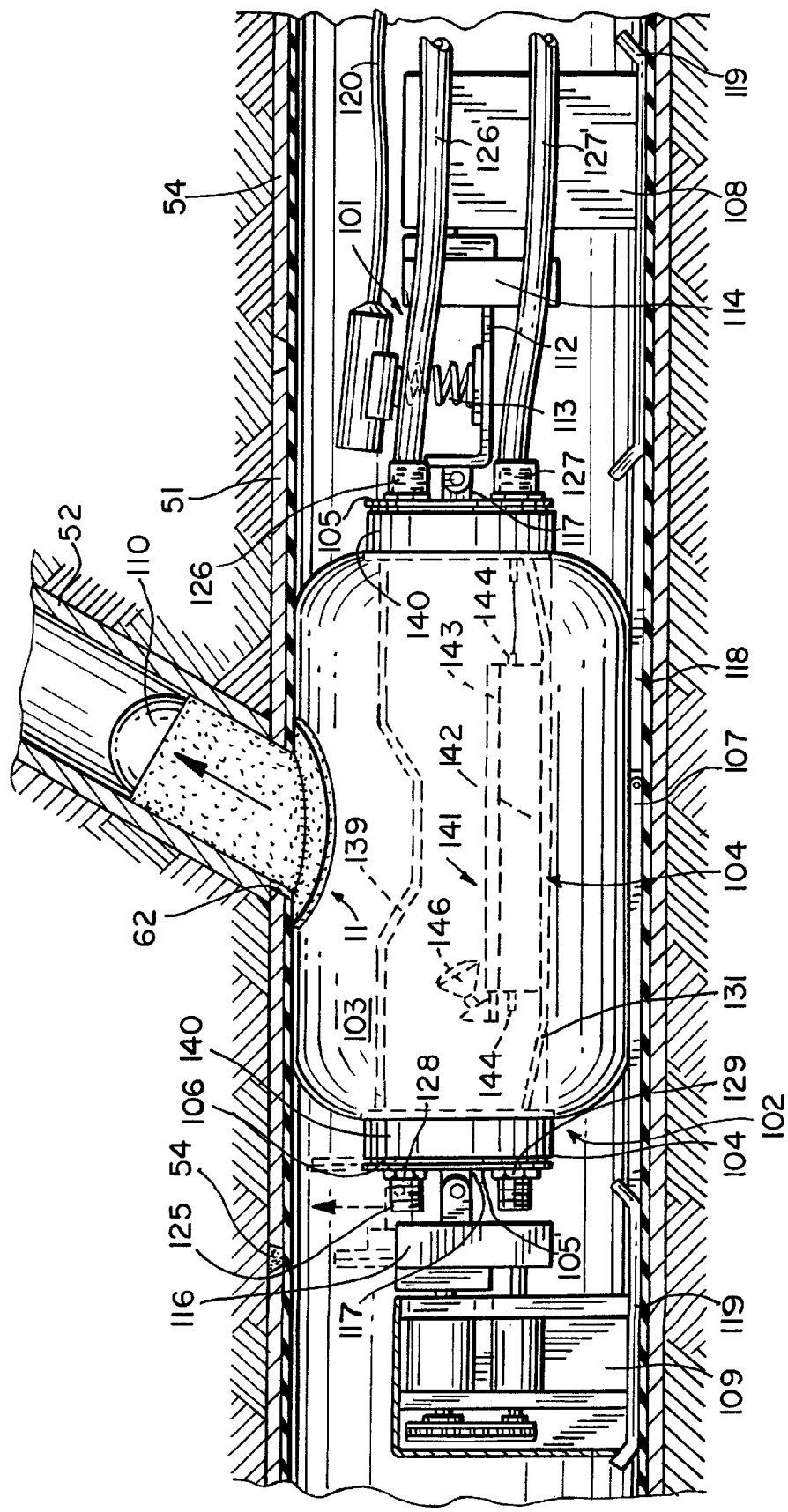
FIG. 11 is a cross-sectional view showing the position of the lateral seal of FIG. 1 after installation.

Lateral seal 11 can be effectively installed utilizing an apparatus shown generally as 101 in FIG. 11. Apparatus 101 includes bladder cartridge 102 including an inflatable bladder 103 with a radially extending bladder arm 110 mounted on a substantially rigid bladder frame 104 having a base 131 and skeleton 139 between identical cup shaped proximal and distal end plates 105 with side wall sections 106. Bladder 103 is mounted to side wall sections 106 of proximal and distal end plates 105 and 105', respectively by tape or banding 140. Bladder frame 104 carrying bladder cartridge 102 is mounted in a delivery sled 107equipped with a proximal positioning motor 108 and a separately operable distal lift motor 109 and a TV camera 111 mounted on a motor arm 112 by a spring 113.

Prior to securing bladder 103 to bladder frame 104, a visible light box 141 including lamps 142 are secured to base plate 131 of bladder frame 104. When a visible light cure system is utilized, lamps 142 emitting visible light within the range of about 400 to 600 nanometers are utilized. Preferably, lamps 142 are 1000 watt halogen lamps having a tungsten halide filament mounted in substantially rectangular light box 141. These lamps emit light rich in the 470 nanometer region. Box 141 has a transparent glass top plate 143. Matching electrical connections 144 are provided both ends of light box 141 so that light bladder frame assembly 102 may be inserted into delivery sled 107 in either direction as discussed above.

When installing lateral seal 11 in lateral pipeline 52, such as shown in FIG. 11 which intersects main pipeline 51 at a wye or angle, it is desirable to provide sufficient light extending into lateral pipeline 52 to insure that the resin in tubular section 13 is fully cured. In order to accomplish this, an additional visible light emitting lamp 146 is provided at one end light box 141 projecting upwardly at an angle into the location of lateral 52. In this embodiment, a small 300 watt projector lamp is aimed towards the dark or short side of wye fitting. The cavity between light box 141 and skeleton 139 at the opposite side of light box 141 is open so that tubular portion 13 of lateral seal 11 can tucked within the interior of bladder frame 102 as seal 11 is loaded for installation.

Motor arm 112 is mounted on rack of a rack and pinion lift bar 114 which is operably coupled to proximal positioning motor 108. Proximal positioning motor 108 provides lift to lift bar 114 for elevating the proximal end of bladder cartridge 102 at a proximal lug 117 connection at proximal end plate 105 and also includes a rotational motor (not shown) for rotating motor arm 112 radially for positioning seal 11 at the entrance to lateral 52. Distal lift motor 109 also includes a lift arm 116 which includes a rack and pinion for lifting or lowering the distal end of bladder cartridge 102 by distal lug connection 117 at distal end plate 105.

Delivery sled 107 includes a base plate 118 for supporting motors 108 and 109. Base plate 118 is mounted on a pair of sled runners 119 at each end for displacement of apparatus 101 along the length of existing main pipeline 51 at the location of lateral 52. Positioning is facilitated by using TV camera 111 which is controlled remotely by a cable 120. TV camera 111 is mounted on spring 113 to permit displacement downward as lift motor 108 lifts bladder cartridge t102 into position adjacent to the opening to lateral 52.

Proximal end plate 105 includes at least one inlet port 126 which provides access to the interior of bladder cartridge 102 for providing a source of pressure to inflate bladder 103 and power a source of radiant energy in the interior of bladder 103 for initiating the cure of resin impregnated in impermeable layer 16 and 21 of seal 11. In the illustrated embodiment, pressure is provided by an air/vacuum hose 126' coupled to inlet port 126. A power line 127' is coupled to another inlet port 127 to provide power to a source of radiant energy within bladder 103. Corresponding ports 128 and 129 are provided in distal end plate 105'. This is beneficial as it permits utilizing one port 128 to allow air to escape when the pressurized fluid is air. Alternately, water can also be expelled through distal output 129. However, this may not be wholly desirable since the portion of the main pipeline being lined is generally bypassed from the remainder of the pipe system. By providing comparable inlet and outlet ports on both proximal end plate 105 and distal end plate 105', bladder cartridge 102 can be inserted into delivery sled 107 in either direction. This greatly facilitates installation of laterals which intersect main pipeline 51 in opposed directions.

As pressurized air is applied to the interior of bladder 103, bladder arm 110 which was tucked within bladder 103 everts through the opening in brim 13 of seal 11 forcing tubular portion 12 of seal 11 to evert into lateral 52. Seal 11 is held in place as long as bladder 103 and arm 110 remain inflated. Generally air or water under pressure can be utilized to inflate bladder 103. When water is utilized and provides heat as the source of radiant energy for initiating the cure, an additional port 129 in distal plate 105 is used to permit the water to circulate.

When lateral seal 11 is positioned in place and bladder 103 is inflated, energy is applied to initiate cure of the resin. When the energy is visible light cool air supplied by air hose 126' is circulated through bladder 103. This removes the heat generated by the exothermic cure reaction and the substantial heat generated by the halogen lamps as the visible light source. An adjustable pressure relief valve 125, such as a Nupro B-8CPA2 regulator which is adjustable between 3 to 50 psi with a ½ inch male thread is mounted in port 128. By inputting air at port 126 at about 20 psi through hose 126' and setting valve 125 at 4 psi, 4 psi pressure can be maintained in bladder 103 to keep it inflated.

At the completion of cure which can be as little as five minutes, a vacuum is drawn through air hose 126' now coupled to a vacuum pump to deflate bladder 103. Application of the vacuum to bladder 103 withdraws arm 110 from lateral 52 and causes it to deinvert into bladder 103. Withdrawal of arm 110 from within seal 11 is thus accomplished without use of a rope or other pulling mechanism which would otherwise present an opaque region and cast a shadow which would interfere with light projected into lateral 52 during the cure cycle.

Providing bladder cartridge 102 as a separate removable unit from delivery sled 107 results in several significant operational advantages. This allows loading of a second impregnated lateral seal 11 on a second bladder cartridge 102 as a first is being used to install and cure at one lateral location. As soon as the lateral connection being installed is completed, delivery sled 107 is removed from main pipeline 51, spent bladder cartridge 102 is removed and a second bladder cartridge 102 previously loaded with resin impregnated seal 11 is then inserted at both lug connections 117 and a second lateral installation can begin immediately. This is a significant time saving advantage. This is particularly true when a visible light cure resin is used.

After curing of resin 34 in lateral seal 11 is accomplished, bladder 103 and tubular arm portion 110 are deflated and removed from main pipeline 51. FIG. 11 shows cured-in-place lateral seal 11 with tubular portion 12 within lateral 52 and ring portion 13 of lateral seal 11 in place in main pipeline 51.

When a light curable resin composition is used to impregnate seal 11, lamps emitting visible light having a wave length in the range of about 400 to 600 nanometers are mounted within bladder 68. In this embodiment, bladder 103 must be fabricated from a flexible, transmissible material, such as silicone, to provide maximum light for curing seal 11. The resin may be impregnated with a modified polyester or epoxy which is light curable and has an appropriate light transmissibility as discussed in U.S. Pat. No. 4,581,247, the contents of which are incorporated herein by reference. Acrylate substituted epoxy resins may be used alone or blended with viscosity modifiers, such as glycols, and initiated by a photo-bleaching visible light initiator. When these materials are used, the resin impregnable material is preferable an acrylic felt. Resin impregnable material 16 and 21 is typically an acrylic or polypropylene felt or a glass fibrous matte which will transmit the visible light when emitted by the lamps within bladder 103.

Resin 34 is a composition of a free radical light cureable resin admixed with an effective amount of a visible light, photo-bleaching initiator system and optionally performance enhancing fillers which can be impregnated into resin impregnable layers 17 and 22 and subsequently cured to a suitable depth. The resin can be selected from oligoeters of mono-ethylenically unsaturated urethanes, epoxies, polyesters and acrylics.

In the preferred embodiments of the invention, the resin is an epoxy acrylate resin which is a diglycydyl ether of bisphenol A which has been esterified with acrylic acid or methacrylic acid and which may include an ethylenically mono-unsaturated compound as a viscosity modifier admixed with an effective amount of a photo-bleaching visible light initiator system. The photo-bleaching initiator system includes a visible light sensitizer which is a fluorone derivative admixed with a hydrogen donor compound.

The visible light curable sensitizer compound includes a fluorone derived material. The fluorone derivative visible light sensitizer compound has the general formula

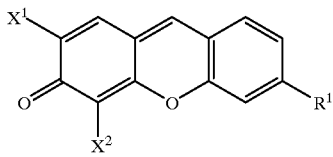

wherein in $R^1$ is hydrogen, $C_1$–$C_8$ alkyl, acyl and $X^1$ is a hydrogen atom or a halogen atom and $X^2$ is a hydrogen atom or the same or different halogen atom, a benzoyl group, a group of the formula —L$(C_2)_n^2$ where n is 1 to 8 and $R^2$ is hydrogen, hydroxy, amino, dialkylamino, —$COR^3$, or —$COOR^4$ wherein $R^3$ is hydrogen, chlorine, COC, $C_1$ to $C_8$ alkyl, aryl, COR, 2,4 dinitrophenyl, N-imido or $N_2$ and L is a direct bond or >C=O and R is hydrogen or lower alkyl, and those disclosed in U.S. Pat. No. 5,451,343. The preferred fluorone derivative is 5,7-diiodo-3-butoxy-6-fluorone. The fluorone derivative sensitizer is mixed with an electron donating coinitiator, such as a tertiary amine to form the photoinitiator system. Triethanolamine has been found to enhance the photo-bleaching effect of the fluorone sensitizer.

It will thus be seen that the objects set forth above, among those made apparent from the preceding description, are efficiently attained and, since certain changes may be made in carrying out the above method (process) and in the article set forth without departing from the spirit and scope of the invention, it is intended that all matter contained in the above description and shown in the accompanying drawing (s) shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. A method of fabrication of a cured in place lateral seal in the shape of a top hat formed of a resin impregnable material having an impermeable layer bonded thereto, comprising:

providing a length of a pipe template having an opening for a lateral connection, the template and opening dimensioned to conform to the configuration of a main pipeline and the lateral to be sealed;

preparing a ring member from a substantial planar piece of the resin impregnable liner material having an inner opening corresponding to the opening in the pipe template;

placing the ring about the opening with the impermeable layer facing the pipe template;

inserting a tubular portion of resin impregnable liner material with the resin absorbent material on the outside into the opening in the ring and template;

placing an expandable plug through the opening in the template by passing it into the tubular portion;

expanding the plug to urge the tubular portion against the opening in the ring;

bonding the adjacent resin impregnable layers of the ring and tubular portion together;

deflating and removing the plug;

removing the assembled ring and tubular portion from the pipe template; and trimming the portion of the tube extending from the surface of the ring having the impermeable layer to form the top hat shape.

2. An apparatus for assembling a cured in place lateral seal for sealing the connection between a main pipeline and a lateral connection to that pipeline, said seal having a substantially planar brim portion of a resin impregnable material having an impermeable layer bonded thereto and a tubular portion having a resin impregnable layer on one side and an impermeable layer bonded thereto with the brim portion bonded to the tubular portion so that the resin impregnable material of both elements are adjacent to each other, said apparatus comprising:

a pipe template having an opening, the pipe and opening dimension are shaped to conform to the main pipeline and lateral opening to be sealed; and an expandable plug for passing into the tubular portion of the seal and when expanded urging the tubular portion against the opening in the pipe template and inner boundary of the brim portion of the seal.

* * * * *